July 28, 1970  G. M. FULMER ET AL  3,521,898
DEMOUNTABLE RUNNING GEAR WITH AIR BAG AND TORSION ARM SUSPENSION
Filed Nov. 22, 1967  6 Sheets-Sheet 1
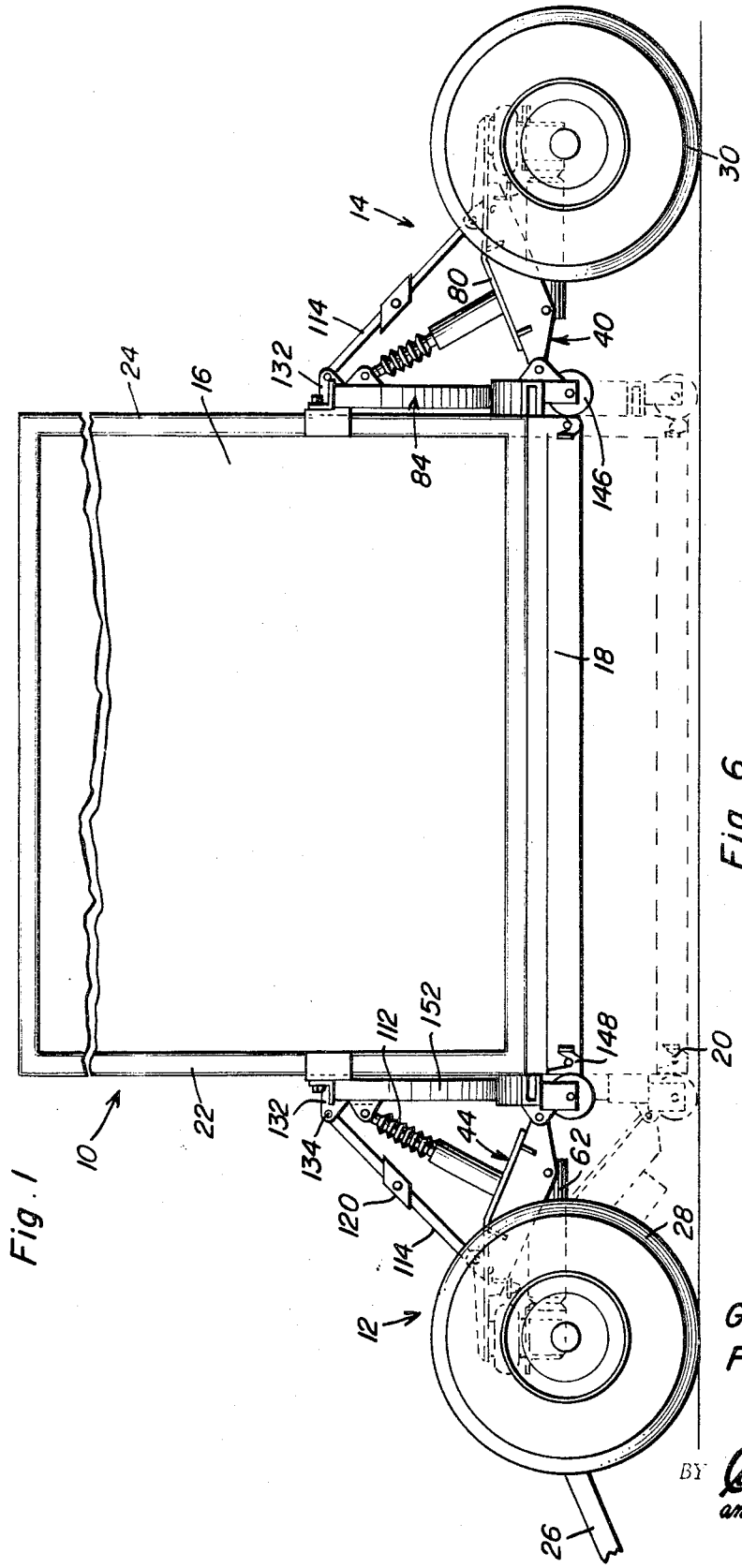
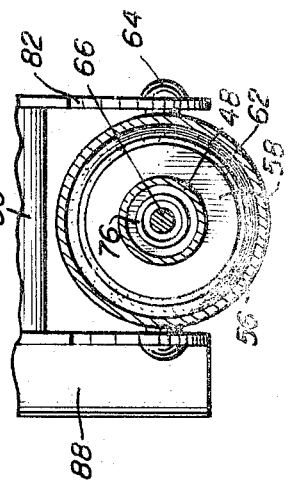
George M. Fulmer
Frank B. Lane
INVENTORS

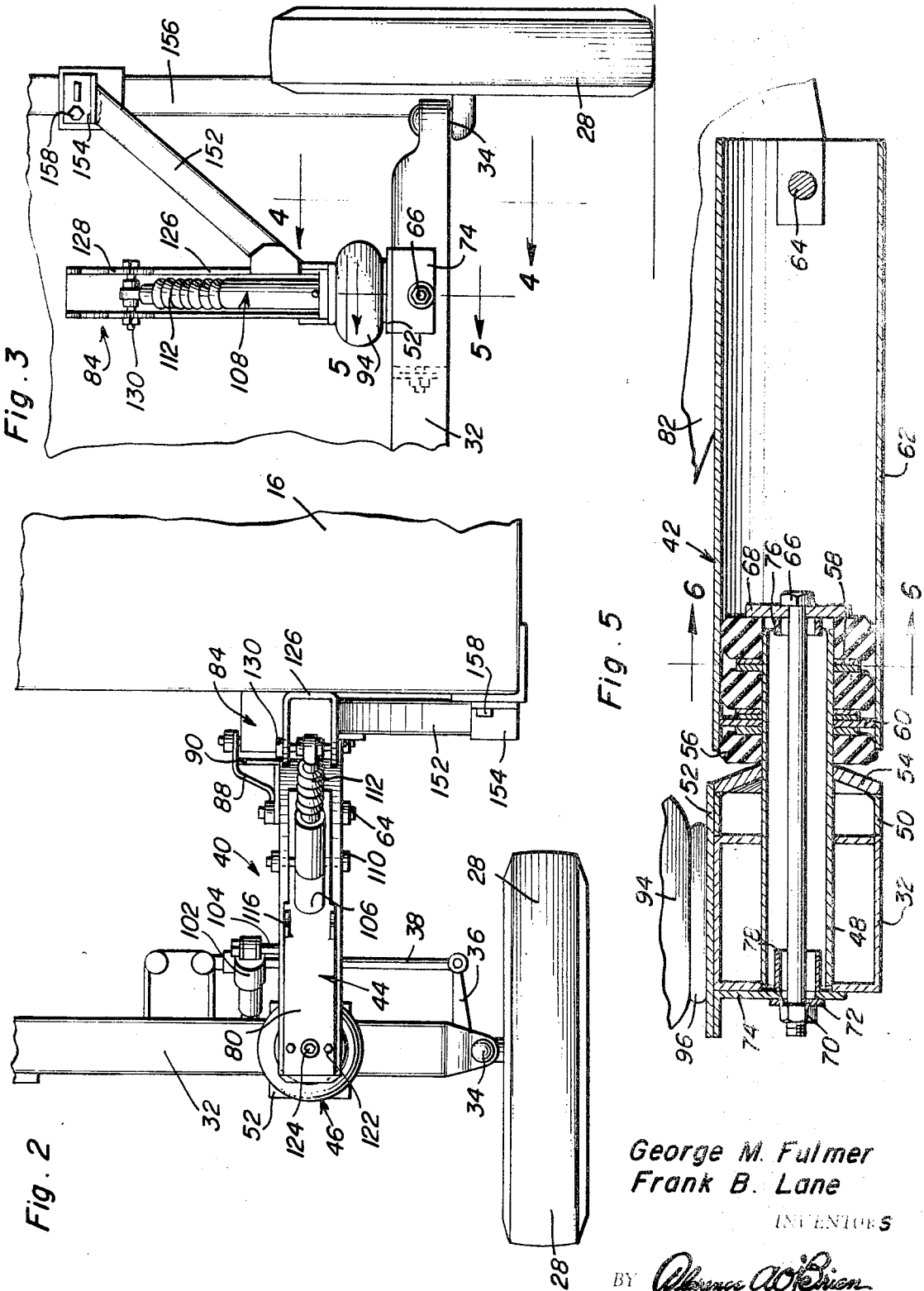

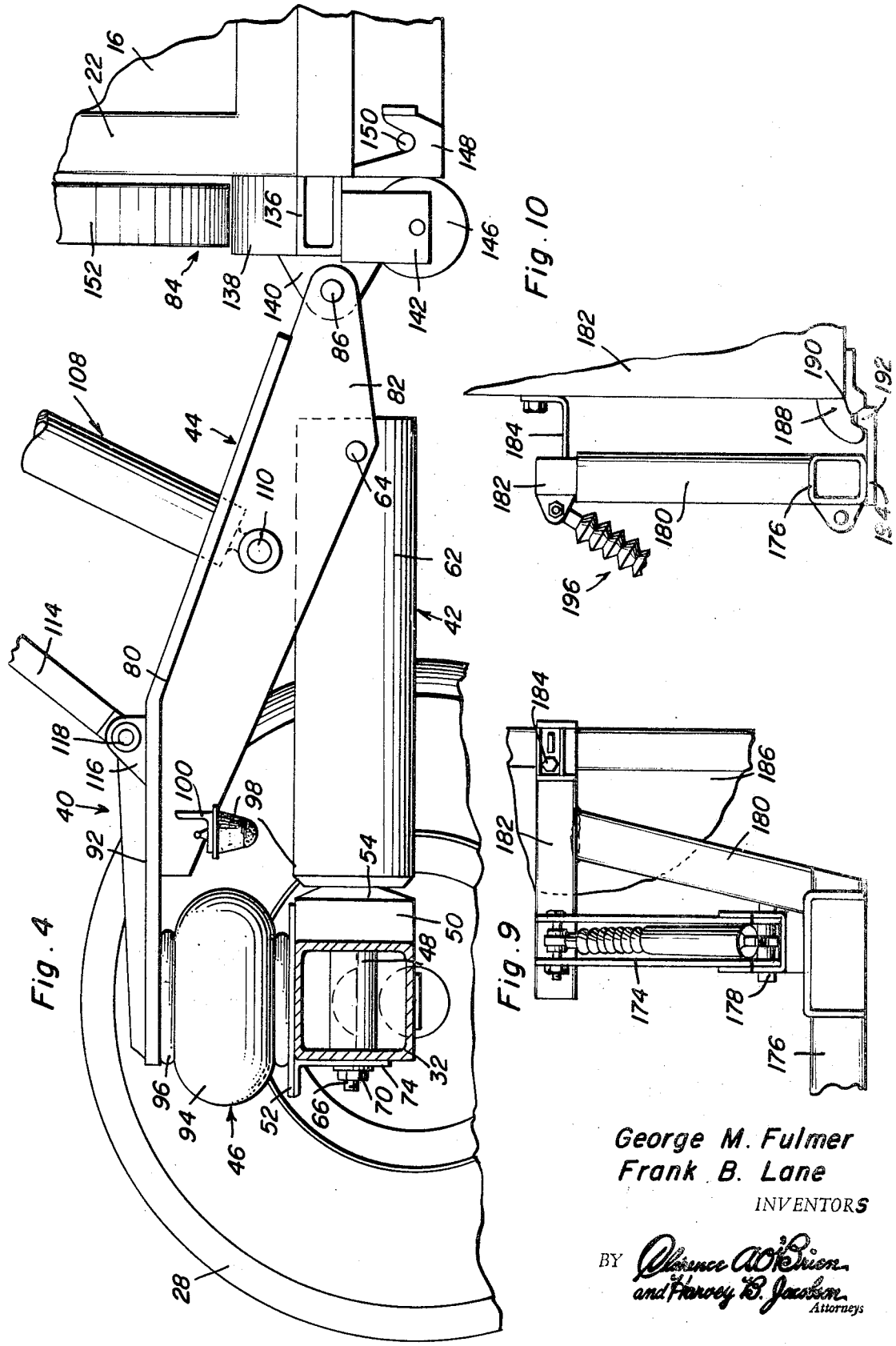

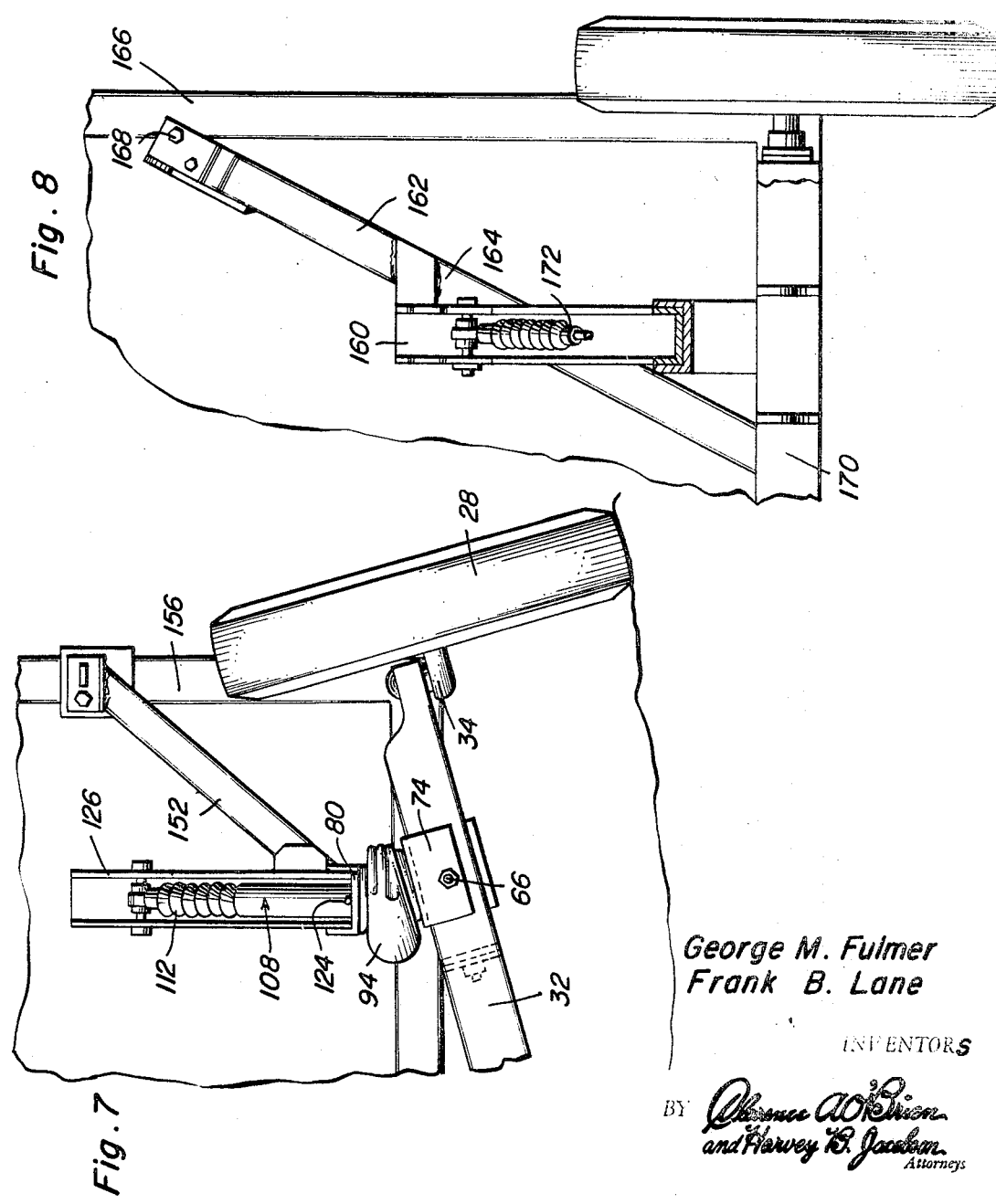

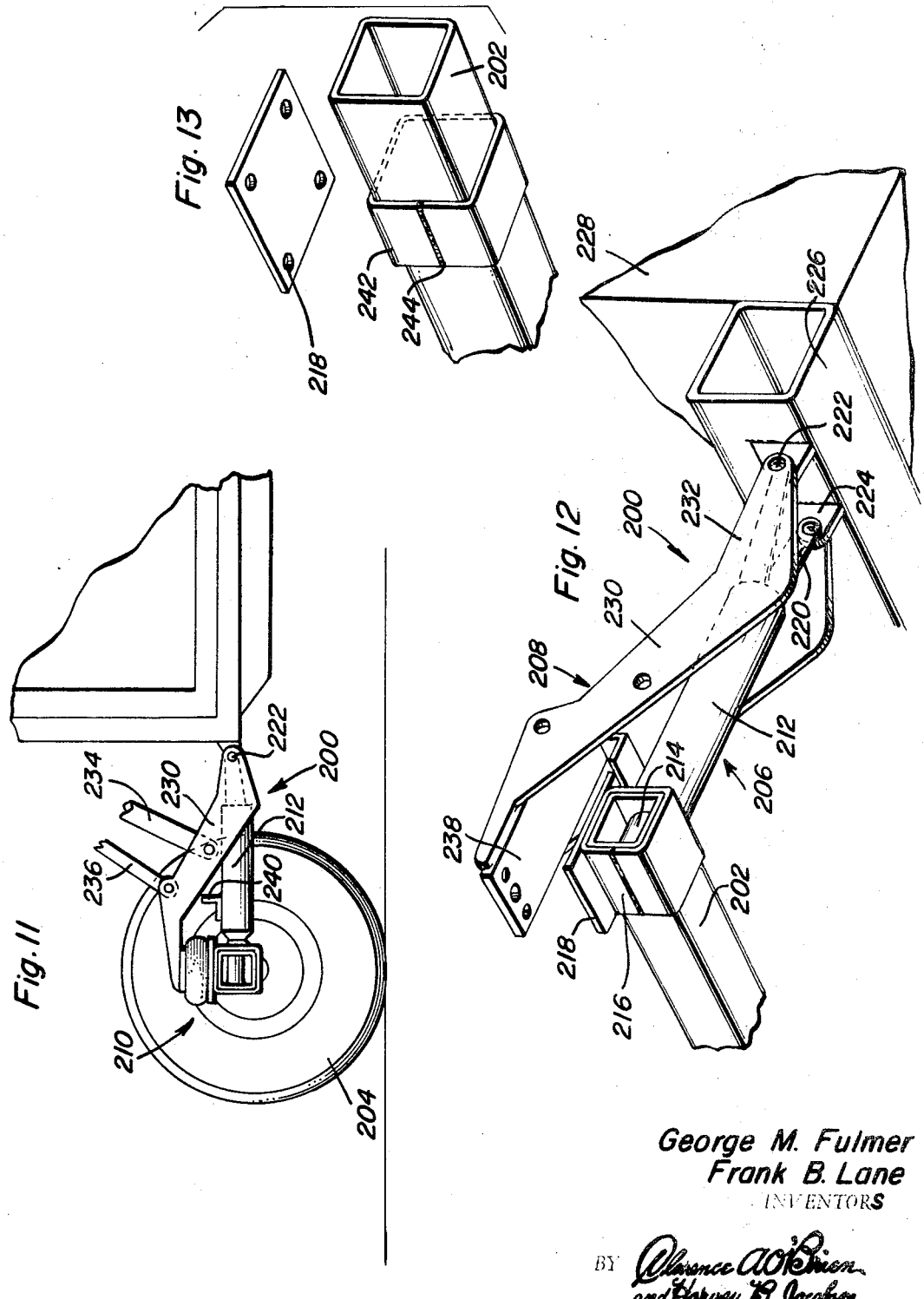

July 28, 1970  G. M. FULMER ET AL  3,521,898
DEMOUNTABLE RUNNING GEAR WITH AIR BAG AND TORSION ARM SUSPENSION
Filed Nov. 22, 1967  6 Sheets-Sheet 6
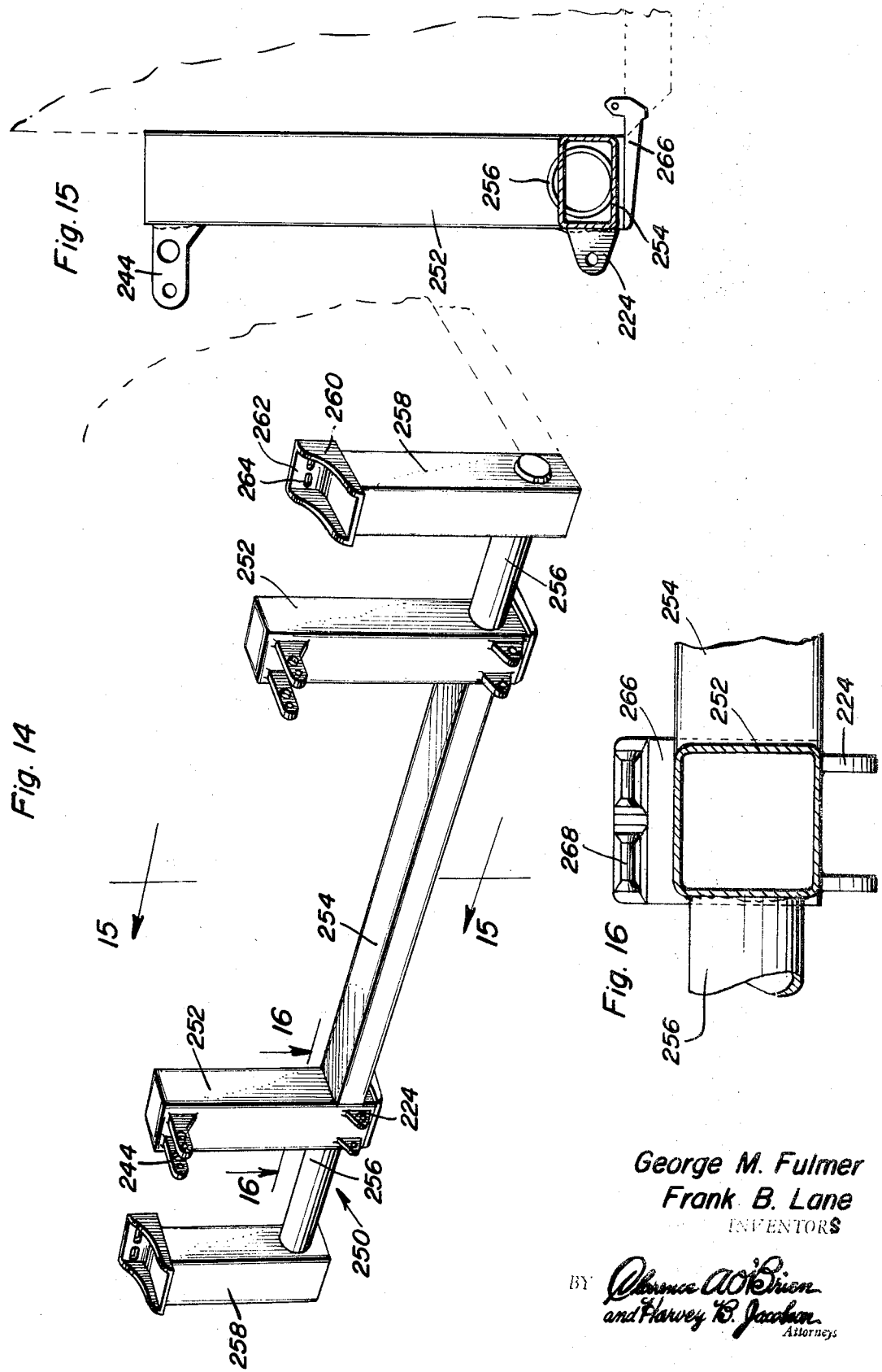
George M. Fulmer
Frank B. Lane
INVENTORS United States Patent Office 3,521,898
Patented July 28, 1970

3,521,898
DEMOUNTABLE RUNNING GEAR WITH AIR BAG AND TORSION ARM SUSPENSION
George M. Fulmer, Silver Spring, and Frank B. Lane, Annapolis, Md., assignors to Gichner Mobile Systems, Inc., a corporation of Maryland
Continuation-in-part of application Ser. No. 596,567, Nov. 23, 1966. This application Nov. 22, 1967, Ser. No. 689,230
Int. Cl. B60g 9/00
U.S. Cl. 280—43.23
14 Claims

ABSTRACT OF THE DISCLOSURE

A running gear for detachable engagement with a load to enable the load to be towed from place to place including an air bag and torsion arm type suspension to enable limited twisting movement between the load and the axle of the running gear during movement over uneven terrain.

This application is a continuation-in-part of copending application Ser. No. 596,567, filed Nov. 23, 1966, now abandoned.

This invention generally relates to a demountable running gear for attachment to a body unit such as a shelter enclosure, a load carrying body or the like and more particularly represents various improvements in that construction, illustrated in prior Pat. Nos. 2,968,490, issued Jan. 17, 1961 for Demountable Running Gear and 3,243,193, issued Mar. 29, 1966, for Hydraulically Operated Demountable Running Gear and improvements in copending application Ser. No. 463,510, filed June 14, 1965, by George M. Fulmer, now Pat. No. 3,378,276, issued Apr. 16, 1968, for Hydraulically Operated Demountable Running Gear With Diagonal Rams, which patents and application are assigned to a common assignee with this application.

An object of the present invention is to provide a demountable running gear for a load carrying body or shelter of substantially rigid construction with the running gear including an improved novel means for elevating and supporting the load carrying body in elevated position so that the body may be easily towed over various surfaces by the use of a suitable towing vehicle with the load carrying body being capable of being levelled so that it can be disposed in a desired level orientation even though the running gear may be resting on an inclined or uneven surface.

An object of the present invention is to provide a demountable running gear for a load carrying body or unit which includes an air bag suspension assembly combined with a supporting arm assembly capable of limited rotation about a longitudinal axis thereby enabling the angular orientation of the demountable running gear to vary about a longitudinal axis parallel to the path of movement thereby enabling the load carrying body or unit to be levelled when it reaches its destination and also to enable the load carrying unit to be transported with less vibration, shock and the like being transferred to the load carrying body and the load carried thereby.

A further object of the present invention is to provide a demountable running gear having outwardly extending attaching arms which enables the running gear to be attached to the load carrying body such as a shelter unit or the like at the outer corners thereof while eliminating the application of a torque force to a transversely extending torque tube by attaching the hydraulically operated rams to the arm or an extension thereof so that the forces exerted by the hydraulic rams will be applied directly to the arms rather than to an offset arm attached to the torque tube which normally introduces a relatively high torsion force into the torque tube which sometimes results in twisting or bending of the transversely extending torque tube.

Yet another important feature of the present invention is to provide a demountable running gear for a load carrying body or unit in which a transversely extending axle is provided with a pair of laterally extending arm assemblies that is supportingly associated with the load carrying body for relative pivotal movement about a transverse axle together with means operatively interconnecting the arm assembly and the load carrying body in a manner to pivot the arm assembly in relation to the load carrying body for elevating the load carrying body and including in the arm assembly, an air bag suspension arrangement, a shock absorber to limit the relative movement of the components of the suspension arrangement or assembly and a torsion arm assembly to enable relative movement of the components of the arm assembly about a longitudinal axis generally perpendicular to the axis of the axle.

Yet other objects of the present invention reside in the ease of attaching and detaching the running gear to the load carrying body, its ruggedness of construction and adaptability for use with various types of load carrying bodies, shelters and the like.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the demountable running gear of the present invention attached to the front and rear of a load carrying body which is illustrated as a shelter unit;

FIG. 2 is a fragmental plan view of one portion of the running gear illustrating the association of the components thereof;

FIG. 3 is an end elevational view of the structure illustrated in FIG. 2;

FIG. 4 is a detailed elevational view, with parts in section, on an enlarged scale, illustrating the structural arrangement of the air bag suspension and torsion arm;

FIG. 5 is a longitudinal, sectional view of the torsion arm illustrating the structural details thereof;

FIG. 6 is a transverse, sectional view taken substantially upon a plane passing along section line 6—6 of FIG. 5 illustrating further structural details of the torsion arm;

FIG. 7 is an end elevational view similar to FIG. 3 but illustrating the axle tilted upwardly in an exaggerated condition as might occur when the wheel traverses a hump;

FIG. 8 is an end elevational view similar to FIG. 3 but illustrating a slightly modified embodiment of the invention;

FIG. 9 is an end elevational view similar to FIGS. 3 and 8 but illustrating another slightly modified embodiment of the invention;

FIG. 10 is a side elevational view of the construction of FIG. 9;

FIG. 11 is a side elevation view illustrating an arrangement in which the connection between the reach arm and air bag engaging arm is coincident with the point of connection with the load attachment;

FIG. 12 is a perspective view of the construction of FIG. 11;

FIG. 13 is a perspective view illustrating the manner in which the attaching bracket is secured to the axle without the use of clamping bolts;

FIG. 14 is a perspective view of a torque tube arrangement for connection with the load;

FIG. 15 is a sectional view taken substantially upon a plane passing along section line 15—15 of FIG. 14 illustrating the structural details of the attaching structure; and FIG. 16 is a plan sectional view taken substantially upon a plane passing along section line 16—16 of FIG. 14 illustrating further structural details of the torsion tube attachment.

Referring now specifically to FIGS. 1–7 of the drawings, the numeral 10 generally designates the load carrying body which is illustrated in combination with the front demountable running gear 12 and the rear demountable running gear 14. For the purposes of illustration, the load carrying body 10 may be a shelter unit 16 having a bottom structure 18 which has a transversely extending rod or pin 20 at the front and rear thereof which may be either in the form of a continuous rod or pins that extend only for a short distance and which are exposed so that the demountable running gears 12 and 14 respectively may be engaged with the forward and rear transverse pins 20 in a manner described hereinafter. Also, the load carrying body 16 is provided with a front wall 22 and a rear wall 24 with which the demountable running gear assemblies 12 and 14 are associated.

The front running gear 12 and rear running gear 14 are substantially the same except that the front running gear 12 is provided with a towing tongue 26 and steerable wheels 28 while the wheels 30 on the rear running gear 14 are not steerable.

The front demountable running gear 12 is illustrated in more detail in FIGS. 1–7 and includes a transversely extending rigid axle 32 which has the steerable wheels 28 attached thereto by pivot pin assemblies 34 and provided with suitable steering arms 36 connected to tie rods 38 and the like which are interconnected with the tongue 26 for steering control in a well-known and conventional manner.

As illustrated, the transverse axle 32 is a hollow box frame member and a pair of supporting assemblies 40 extend therefrom in generally perpendicular relation with each assembly 40 including an elongated torsion arm 42, a suspension arm 44 and an air bag 46.

FIG. 5 illustrates in more detail the construction of the torsion arm 42 which is orientated in perpendicular relation to the axle 32 and in substantially the same horizontal plane. The torsion arm 42 includes a tubular member 48 which extends through the hollow axle 32 and which may be welded to the front and rear wall thereof and which terminates at the front surface of the axle 32 and projects laterally or rearwardly of the rear surface thereof with of course the rear assembly being oppositely arranged as that illustrated in FIG. 5. Attached to the rear of the axle 32 is a sleeve 50 which is preferably square in configuration and welded to the axle 32 which provides support for one end of a mounting plate 52 which also rests against the top surface of the axle 42 and extends forwardly from the forward edge thereof. Rigidly fixed to the sleeve 50 is an annular plate 54 which is frusto-conical in configuration with the center of the plate 54 being rigidly fixed to the tube 48 and the outer edge thereof being rigidly fixed to the sleeve 50, to serve as a means for further rigidifying the tube 48 and to provide engagement with an innermost rubber shock mounting disk 56. As illustrated, there are three rubber disks 56 oriented in spaced relation along the tubular member 48 which are spaced from each other by spacer washers 58. Between the innermost and second rubber disks, a plate 60 is provided on the tubular member 48 with the washers 58 being disposed on each side thereof and the inner edge of the plate 60 is movable on but relatively closely fitting the tubular member 48.

The outer edge of the plate 60 is rigidly fixed to an elongated tubular arm 62 which telescopes and receives all of the rubber disks 56 and extends rearwardly beyond the end of the tubular member 48. The outer end of the tubular arm 62 is pivotally attached to the suspension arm 44 by a transversely extending pivot bolt 64 which enables pivotal movement of the suspension arm 44 in relation to the torsion arm 42.

Extending through the tubular member 48 is a tie bolt 66 having the head thereof engaging an end plate 68 which engages the inner surface of the endmost rubber bushing or disk 56 so that as the bolt 66 is tensioned, compression force will be exerted on the rubber disks 56. The other end of the bolt 66 is provided with a nut 70 by which tension may be applied to the bolt 66 and the nut 70 engages a washer 72 which in turn rests against the vertical flange of a right angular member 74 which has the horizontal flange thereof in alignment with the top surface of the axle 32 and supports the forward edge of the mounting plate 52 for the air bag suspension 46. The inner surface of the plate 68 is provided with a short inwardly extending sleeve 76 to guidingly retain the plate 68 in relation to the tubular member 48 and the inner surface of the vertical flange of the angle member 74 is provided with a similar sleeve 78 to guide the bolt 66.

Any suitable structure may be provided for preventing the bolt from turning while enabling longitudinal movement thereof. Such structure may involve welding of the nut 70 to the plate 68 and bonding of the plate 68 to the endmost rubber disk 56 or providing a square shank on the bolt and a square hole through the vertical flange of the angled member 74 so that as the nut 70 is tightened, compressive forces are exerted on the rubber disk between the plate 68 and the annular plate 54. The spacers and washers are frictionally clamped with the plate 60 retaining the tubular arm 62 mounted on the tubular member 68 but enabling the relative movement thereof about its longitudinal axis with the resistance to such movement being exerted by the compressed disk 56. The disk 56 will also enable a certain limited degree of relative lateral deflection or movement of the axle 32 and tube 48 in relation to the tubular arm 62 as may occur during tilting or twisting of the axle 32 in relation to the load body.

While the disk or shock mounting 56 may be constructed of rubber, they also may be constructed of neoprene or other similar long-lasting material and the number of such disks may vary depending upon the load requirements and the like.

FIG. 4 illustrates the relationship of the suspension arm 44 to the torsion arm 42 with the suspension arm including an elongated and annular plate-like structure 80 having depending flanges 82 extending for a substantial part of the length thereof with the flanges 82 being received on opposite sides of the tubular arm 62 with the pivot bolt 64 extending therethrough. The forward end of one of the flanges or depending plate 82 is rounded and is joined to an attaching assembly generally designated by the numeral 84 by a pivot pin or bolt 86 (see FIG. 4). For stability and rigidity, the flange or plate 82 at the inner side of the suspension arm 44 is provided with an outwardly offset plate 88 having one end thereof welded to flange 82 adjacent pivot bolt 64 and the other end thereof received on the pivot bolt 86 with a right angle reinforcement member 90 being fixed to the inner flange or plate 82 and the offset plate 88 to provide a rigid structure for receiving the pivot bolt 86 thereby enabling a longer pivot bolt 86 to be employed by having the end of the innermost plate 82 omitted and the end of the offset plate 88 forming the pivotal connection at the inner side of the suspension arm 44, thereby increasing lateral stability. The end of the suspension arm 44 overlying the axle 32 is substantially horizontally arranged and includes upstanding but relatively narrow reinforcing flanges 92 with the plate 80 terminating in spaced relation to the mounting plate 52 for receiving the air bag suspension 46 therebetween. The air bag suspension 46 is conventional in construction and includes a central flexible bag or bellows 94 and top and bottom mounting plates 96 which are attached respectively to the terminal end portion of the plate 80 and the mounting plate 52 by suitable fasteners in a conventional manner. Thus, the pivotal movement of the suspension arm 44 about the pivot pin 64 will be cushioned by the air bag 46. For limiting the movement of the suspension arm 44 toward the tubular member 62, a rubber bumper 98 is provided and is mounted on an attaching bracket 100 carried by the depending plates or flanges 82 and for dampening oscillatory movement of the suspension arm 44, a conventional telescopic shock absorber assembly 102 may interconnect the suspension arm 44 and the axle with suitable brackets 104 being provided therefor.

The plate 80 is provided with an elongated slot-like opening 106 therein for receiving the lower end of a hydraulic piston and cylinder assembly 108 which has the lower end thereof pivoted between the plates 82 by a pivot bolt 110 or the like. The upper end of the piston and cyclinder assembly 108 is attached to the attaching structure 84 in a manner described hereinafter with the piston and cylinder assembly either being double-acting or single-acting and provided with a protective bellows 112 for the piston rod. Also attached to the plate 80 in spaced relation to the piston and cylinder assembly 108 is a locking brace 114 pivoted between upstanding ears 116 by a pivot bolt 118 or the like. The brace 114 is also connected to the attaching assembly 84 and is provided with a central lock device 120 for retaining the brace in extended position for enabling the load unit to be retained in elevated position without maintaining pressure in the piston and cylinder assembly. The specific details of the piston and cylinder assembly and the lock mechanism are disclosed in more detail in the previously mentioned copending application and prior patents. As illustrated in FIG. 2, the plate 80 is attached to the air bag 46 by fasteners 122 and an air valve 124 will also be provided so that the inflated characteristics of the air bag may be varied thereby varying the cushioning characteristics thereof.

The attaching assembly 84 includes a vertically elongated channel-shaped member 126 having gears 128 on the upper end thereof which pivotally connects to the upper end of the piston and cylinder assembly 108 by a pivot bolt 130. Also, ears 132 are provided at the upper end thereof for pivotal connection to the lock brace 114 by a pivot bolt 134. The bottom of the channel-shaped member 126 is connected to a transverse beam 136 or the like by reinforcing gussets 138 and laterally extending lugs 140 are provided for pivotal engagement by the pivot bolt 86. Depending brackets 142 are provided for rollingly supporting a small wheel 146 and also depending brackets of the hook-type 148 are provided for engagement with projecting pins or horizontal rods 150 rigid with the bottom 18 with the load unit. The specific construction of the attaching structure may be varied depending upon the construction of the load unit itself in that the specific manner of connecting the upright member 126 to the load unit may vary depending upon the construction of the load unit itself. The channel-shaped member 126 may be attached to the load unit or separated therefrom and if it is desired not to exert pressure on the load unit inwardly of the side edges thereof, a laterally and upwardly inclined member 152 is provided which is rigid with the channel-shaped member 126 and provided with an attaching bracket 152 at the upper end thereof for connection with the edge frame 156 of the load unit by a suitable fastening bolt 158 or the like.

FIG. 7 illustrates in a somewhat exaggerated manner the orientation of the air bag suspension when the axle 32 is pivoted in relation to the load unit. During this twisting movement, the resilient disk 66 permits resilient rotation of the torsion arm 62 and limited lateral deflection thereof.

FIG. 8 illustrates another embodiment of the invention which involves the modified attaching structure and which includes an upwardly extending channel-shaped member 160 connected to an elongated diagonally arranged pylon or arm 162 which extends diagonally across the upstanding member 100 and is attached thereto by a gusset 164. The pylon or arm 162 is attached to a load carrying unit 166 by an attaching bolt and bracket assembly 168 and the lower end thereof is fixed to the transversely extending member 170 at the lower corner of the load unit 166 inwardly of the upstanding member 160. The association of the piston and cylinder assembly 172, the suspension arm and other components of the assembly is the same or equivalent to the structure disclosed in detail in FIGS. 1–7.

FIGS. 9 and 10 disclose another embodiment of the invention in which the upstanding member 174 is connected to the transversely extending tubular member 176 at its lower end by a pivotal connection 178 and the outer end of the transversely extending member 176 is provided with an upwardly extending arm or pylon 180 rigidly affixed thereto. The upper end of the arm or pylon 180 is provided with a transversely extending horizontal member 182 rigidly fixed to the upper end of the upstanding member 174 and having an attaching bracket assembly 184 at the upper end thereof for connection with the load carrying unit or body 186. This structure also illustrates a different type of connection between the transverse member and the load carrying unit. This involves a projection 188 on the load carrying unit 182 and a downwardly opening socket or recess 190 thereon for receiving an upstanding projection 192 on a laterally extending bracket 194 carried by the transverse tubular member 176. The piston and cylinder assembly 196 is the same as disclosed in the other embodiments of the invention and the same lock mechanism may be employed.

The air bag suspension unit effectively cushions the load carrying body and absorbs shocks encountered by the wheels. Further, the air bags combined with the external shock absorber provide an adequate suspension assembly for various load conditions. The torsion arm also absorbs shock and enables relative movement of the tubular member 62 in relation to the axle 32 both as to relative rotation of the tubular member 62 and lateral deflection thereof so that the load body unit may be levelled in relation to the axle 42 by selectively expanding or contracting the hydraulic piston and cylinder assemblies or rams and this will also enable the load unit to traverse uneven terrain with less movement and shock imparted to the load unit. The construction of the torsion arm enables the torsion resisting characteristics thereof to be varied by tightening or loosening the bolt which is non-rotative but longitudinally slidable in relation to the components of the torsion arm.

Subsequent to the filing of our earlier copending application Ser. No. 596,567, filed Nov. 23, 1966, modifications within the scope of our invention have been made in the construction by other engineers in the employ of the assignee. Such modifications are illustrated in FIGS. 11–16 and relate specifically to the supporting assembly illustrated in FIGS. 11–13 and generally designated by the numeral 200 and which include a hollow transversely extending rigid axle 202 with a wheel assembly 204 mounted on each end thereof. Each supporting assembly 200 includes an elongated torsion or reach arm 206, a suspension arm 208 and an air bag assembly 210.

The torsion arm 206 is substantially the same insofar as internal construction and operation is concerned as illustrated in FIG. 5 in that it includes an outer tube 212 connected with the axle 202 by an inner tubular member 214 and a bracket structure 216 which includes a support plate 218 for the air bag assembly 210. The outer end of the tube 212 is provided with a pair of longitudinally extending arms 220 rigid therewith with the outer ends of the arms 220 being mounted on a transverse pivot pin 222 which extends through lugs 224 on the transverse attaching beam, torque tube or the like 226 which is connected to the shelter unit or load 228 in the same manner as illustrated in the other drawings.

The suspension arm 208 is in the form of an elongated channel-shaped member 230 which has a pair of longitudinally extending arms 232 thereon in which the outer ends thereof are pivoted to the transverse pin or fastener 222 thus securing the suspension arm 208 and the torque tube or reach arm 206 to the transverse torque tube or reach arm 206 to the transverse torque tube or beam 226 for pivotal movement about the same axis as compared with the spaced axes 64 and 86 as illustrated in FIG. 4. The hydraulic ram or piston and cylinder assembly 234 and lock brace 236 therefor are attached to the suspension arm 208 in the same manner or an equivalent manner to that illustrated in FIG. 4. Also, the air bag assembly 210 is connected with and associated with the flat plate portion 238 of the suspension arm 208 in the same manner as in FIG. 4.

A limit lug 240 may be provided on the tube 206 to limit the pivotal movement of the suspension arm 208 toward the axle 202.

As illustrated in FIG. 13, the attaching plate 218 is welded to an endless band 242 which is in the form of two U-shaped members attached to the hollow axle 202 by welding the ends of the U-shaped members together along weld lines 244 which will rigidly shrink fit the annular band 242 onto the axle 202 without employing separate clamp bolts or holes drilled through the axle which would produce stress concentration points.

FIGS. 14–16 illustrate a torque tube assembly generally designated by numeral 250 employed for attaching the supporting assembly to the shelter unit or load which is identical at each side of the load unit with each side of the torque tube assembly including an upstanding arm 252 having outwardly extending brackets or lugs 254 to which the upper ends of the ram 234 and lock brace 236 are attached. The lower end of the member 252 is provided with the lugs 224 thereon. Interconnecting the upright arms or tubular members 252 is a connecting member 255 that is conveniently welded to the member 252.

Extending outwardly from the other side of the upright arm 252 is a torque tube 256 extending through and rigidly attached to an upright attaching arm 258 which has a bracket 260 at the upper end thereof. The bracket 260 includes an upright attaching plate 262 having apertures 264 therein by which the bracket 260 may be bolted to the shelter unit in a conventional manner. The lower end of the upright arm 252 is provided with a forwardly extending bracket 266 for engagement with the shelter unit by engagement with a socket therein or by a suitable bolt-type fastener or the like. As illustrated, the bracket 266 is a pair of transversely extending rods 268 received in a downwardly opening socket or recess defined in the load unit or shelter.

The particular construction of the torque tube 256 enables the forces exerted against the shelter to be imparted to the shelter at the outer edge thereof where the framing structure of the shelter unit or load itself is substantially more rigid than at a point inwardly from the side edge thereof. The interconnecting tube between the upright arms does not transmit any torque inasmuch as the two hydraulic rams will operate simultaneously.

Also, the structure of the reach tube and suspension arm being pivotally connected by a single pivot pin which also connects the supporting assembly to the upright support arm or attachment member reduces the component parts of the support assembly, reduces the overall weight thereof and increases the effectiveness of the attachment to the load unit. The attaching band or bracket on the axle which is shrunk thereon by the ends of the U-shaped members being welded together provide a rigid connection with the axle and one which eliminates the stress points as would occur if the bracket was welded around the periphery thereof to the axle or clamped to the axle by clamp bolts or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In a demountable running gear assembly used in combination with a body unit, a wheeled assembly including an axle with wheels mounted on the outer ends thereof, a pair of laterally extending arm assemblies connected with the axle, means connecting the ends of the arm assemblies remote from the axle with the body unit for relative pivotal movement therebetween, fluid pressure operated means operatively exerting force between the running gear and body unit for pivoting the running gear relative to the body unit, that improvement comprising said arm assembly including a torsion arm connected with the axle and extending therefrom, a suspension arm connected to the torsion arm for pivotal movement, said suspension arm having one end thereof adapted to be connected with the load unit and the other end disposed adjacent the axle with an intermediate portion of the suspension arm being pivotally connected with said torsion arm, and cushion means operatively associated with the axle and the end of the suspension arm adjacent thereto for cushioning movement of the suspension arm and body unit in relation to the axle.

2. The structure as defined in claim 1 wherein said torsion arm includes a laterally extending member rigid with said axle and extending perpendicular therefrom, a tubular sleeve telescoped over said member over a substantial portion of its length, means retaining the sleeve on the member, said retaining means including resilient means interposed between the sleeve and the member for enabling limited lateral, longitudinal and rotational movement of the sleeve in relation to the member, and means for adjusting the resilient characteristics of the said resilient means.

3. The structure as defined in claim 1 wherein said cushion means includes an air bag, said suspension arm having the end thereof adjacent the axle disposed in vertically spaced relation to the axle, said air bag being interposed between the axle and adjacent end of the suspension arm and connected thereto in order to cushion relative movement between the suspension arm and the torsion arm about the pivotal connection therebetween.

4. The structure as defined in claim 1 wherein the outer end portions of said arm assemblies each have an upstanding and outwardly inclined pylon structure connected thereto, and means rigid with the pylon structure for connection with the load unit above the lower end thereof, and means associated with the pylon structure for connection with the fluid pressure operated means.

5. The structure as defined in claim 4 wherein said means on the pylon structure includes an upstanding member diverging in relation to the pylon structure with the upper end of the pylon structure and the upper end of the member extending therefrom terminating at substantially the same elevation to enable attachment of the pylon structure to the load unit at outwardly spaced points in relation to the fluid pressure operated means.

6. A demountable running gear for a load unit comprising a rigid axle, means supporting the opposite ends of said axle from a supporting surface, a pair of arm assemblies mounted from said axle, means at the outer end of each arm assembly for articulate association with the load unit, means applying force to move the axle downwardly in relation to the load unit, each arm assembly including means cushioning relaitve vertical and angular movement of the axle and load unit, torsion means limiting and cushioning relative movement of the axle and load unit about a longitudinal axis for enabling variation in height relation of the ends of the axle to the load unit to provide levelling of the load unit.

7. The structure as defined in claim 6 wherein said means cushioning the relative vertical and angular movement of the axle including an air bag assembly having one portion connected with said axle and an opposite portion connected with a movable component of the arm assembly.

8. The structure as defined in claim 7 wherein said means limiting and cushioning longitudinal and lateral movement includes a torsion arm attached to said axle and extending toward the load unit, said torsion arm including a rigid member rigidly fixed to the axle, a sleeve mounted on said rigid member in encircling relation, resilient sleeve means interposed between said member and encircling sleeve to enable limited lateral movement of the sleeve in relation to the member and relative rotation of the sleeve in relation to the member which combines with the air bag assembly to enable the ends of the rigid axle to move vertically in relation to the load unit.

9. The structure as defined in claim 8 wherein said rigid member is tubular, said resilient sleeve means including a plurality of resilient disks mounted on the tubular member and engaging the inner surface of the sleeve, and means compressing the resilient disks to frictionally engage the tubular member and sleeve.

10. The combination of claim 9 wherein said compressing means includes a tension bolt extending through the axle and tubular member and having a plate on the inner end thereof engaging the innermost disk to compress the disks toward the axle.

11. In a demountable running gear assembly used in combination with a body unit, a wheeled assembly including an axle with wheels mounted on the outer ends thereof, a pair of laterally extending arm assemblies connected with the axle, means connecting the ends of the arm assemblies remote from the axle with the body unit for relative pivotal movement therebetween, fluid pressure operated means operatively exerting force between the running gear and body unit for pivoting the running gear relative to the body unit, that improvement comprising said arm assembly including a torsion arm means connected with the axle and extending laterally therefrom, means connecting the outer end of each torsion arm means with the load unit for relative pivotal movement therebetween, said torsion arm means including a pair of spaced members, one of said members being rigid with the axle and the other of said members being spaced therefrom and including the means for attachment to the load unit, and resilient means interposed between said members for enabling limited lateral, longitudinal and rotational movement of the members in relation to each other.

12. The structure as defined in claim 11 wherein the member rigid with the axle is telescopically arranged with the other of said members, said resilient means being interposed between the telescopically arranged members, and means adjusting the resilient characteristics of said resilient means for varying the resistance to relative lateral, longitudinal and rotational movement between said telescopically arranged members.

13. In a demountable running gear assembly used in combination with a body unit, a wheeled assembly including an axle with wheels mounted on the outer ends thereof, a pair of laterally extending arm assemblies connected with the axle, means connecting the ends of the arm assemblies remote from the axle with the body unit for relative pivotal movement therebetween, fluid pressure operated means operatively exerting force between the running gear and body unit for pivoting the running gear relative to the body unit, that improvement comprising said arm assembly including a suspension arm having one end thereof adapted to be connected with the load unit and the other end disposed adjacent the axle in substantially vertically spaced relation thereto, means pivotally supporting an intermediate portion of the suspension arm for pivotal movement about substantially a transverse axis parallel to the longitudinal axis of the axle, and cushion means operatively associated with the axle and the end of the suspension arm adjacent thereto for cushioning movement of the suspension arm and body unit in relation to the axle.

14. The structure as defined in claim 13 wherein said cushion means includes an air bag, said air bag being interposed between the axle and adjacent end of the suspension arm and connected thereto in order to cushion relative movement between the suspension arm and the axle about the pivotal support axis for the suspension arm.

References Cited

UNITED STATES PATENTS

| 2,453,117 | 11/1948 | Buckendale | 267—57.1 |
| 3,140,880 | 7/1964 | Masser | 267—22 |
| 3,378,276 | 4/1968 | Fulmer | 280—43.23 |
| 3,315,974 | 4/1967 | Weaver et al. | 280—35 |
| 3,386,747 | 6/1968 | Watt | 280—35 |

KENNETH H. BETTS, Primary Examiner

U.S. Cl. X.R.

267—57.1, 22; 280—35